United States Patent
Nakagawa (10) Patent No.: US 8,693,343 B2
(45) Date of Patent: Apr. 8, 2014

(54) RELAY APPARATUS, VIRTUAL MACHINE SYSTEM, AND RELAY METHOD

(75) Inventor: Yukihiro Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 13/021,285

(22) Filed: Feb. 4, 2011

(65) Prior Publication Data
US 2011/0205904 A1 Aug. 25, 2011

(30) Foreign Application Priority Data
Feb. 19, 2010 (JP) .................................. 2010-034360

(51) Int. Cl.
H04L 12/56 (2011.01)
H04L 12/28 (2006.01)
H04L 12/26 (2006.01)
G06F 15/167 (2006.01)
G06F 9/445 (2006.01)

(52) U.S. Cl.
USPC ........... 370/241; 370/255; 370/312; 370/392; 370/412; 370/428; 709/203; 709/224; 709/245; 718/1

(58) Field of Classification Search
USPC ......... 370/216–228, 241, 242, 252, 254, 255, 370/312, 390, 392, 315, 401, 432; 709/223, 709/224, 245, 250
See application file for complete search history.

(56) References Cited

U.S. PATENT DOCUMENTS

| | | | |
|---|---|---|---|
| 8,321,862 B2 * | 11/2012 | Swamy et al. ..................... 718/1 |
| 2005/0002391 A1 * | 1/2005 | Matsuda et al. .............. 370/389 |
| 2006/0002391 A1 * | 1/2006 | Takihiro et al. ............... 370/390 |
| 2007/0280243 A1 * | 12/2007 | Wray et al. .................... 370/392 |
| 2008/0028071 A1 * | 1/2008 | Miyajima ..................... 709/224 |
| 2009/0240790 A1 * | 9/2009 | Utsunomiya et al. ......... 709/221 |
| 2010/0115080 A1 * | 5/2010 | Kageyama .................... 709/223 |
| 2011/0093849 A1 * | 4/2011 | Chawla et al. ..................... 718/1 |

FOREIGN PATENT DOCUMENTS

| | | |
|---|---|---|
| JP | 2005-286681 | 10/2005 |
| JP | 2008-217302 A | 9/2008 |
| JP | 2009-232207 | 10/2009 |

OTHER PUBLICATIONS

VMWARE, "Using IP Multicast with VMware ESX3.5", URL:http://www.vmware.com/files/pdf/technology/esx35_ip_multicast.pdfURL, downloaded on Nov. 25, 2009, pp. 1-9.
Japanese Office Action mailed Nov. 19, 2013 for corresponding Japanese Application No. 2010-034360, with partial English-language translation.

* cited by examiner

*Primary Examiner* — Candal Elpenord
(74) *Attorney, Agent, or Firm* — Fujitsu Patent Center (57) ABSTRACT

According to an embodiment of the application, a relay apparatus includes a destination storage unit configured to store the information about a destination of a multicast packet in association with a multicast address; a determination unit configured to determine whether the destination of the multicast packet is a first physical machine on the basis of the destination information stored in the destination storage unit in a migration process in which a virtual machine operating on the first physical machine is migrated to a second physical machine; and an addition unit configured to add information about the second physical machine to the destination information in the destination storage unit, the destination information corresponding to the multicast address that indicates the destination of the first physical machine, if the determination unit determines that the destination of the multicast packet is the first physical machine.

5 Claims, 9 Drawing Sheets

| VLAN NUMBER | MEMBER PORT NUMBER |
|---|---|
| V1 | P11, P21 |
| V2 | P12, P21 |
| V3 | P13, P22 |
| ⋮ | ⋮ |

FIG. 7

| MAC ADDRESS | VLAN NUMBER | PORT NUMBER |
|---|---|---|
| 00:01:02:03:04:05 | V1 | P11 |
| 00:01:02:03:04:06 | V2 | P12 |
| 01:00:5e:xx:xx:xx | V1 | P11, P14 |
| 01:00:5e:yy:yy:yy | V2 | P12, P14 |
| ⋮ | ⋮ | ⋮ |

PRIOR ART

⟶ : Join MESSAGE
┄┄▶ : MULTICAST PACKET

RELAY APPARATUS, VIRTUAL MACHINE SYSTEM, AND RELAY METHOD

CROSS-REFERENCE TO RELATED APPLICATION

This application is based upon and claims the benefit of priority of the prior Japanese Patent Application No. 2010-34360, filed on Feb. 19, 2010 the entire contents of which are incorporated herein by reference.

FIELD

The application relates to a relay apparatus, a virtual machine system, and a relay method.

BACKGROUND

Virtual machine systems in which virtual machines (hereinafter sometimes referred to as "VMs") are caused to operate on physical machines have been used. A technology called VM dynamic migration (hereinafter referred to as "live migration") is used in such a virtual machine system. In the live migration, the physical machine on which the virtual machine operates is migrated to another physical machine without barely stopping a service provided by the VM.

However, the virtual machine system in the related art described has the problem in that, when Internet Group Management Protocol (IGMP) is applied, the physical machine cannot possibly receive a multicast packet for a certain time after the live migration is executed.

Such a problem is described with reference to FIG. 10. In an example illustrated in FIG. 10, a router 92 and servers 93A and 93B, which are physical machines, are connected to a physical switch 91. A VM 94A, which is a virtual machine, operates on the server 93A. It is assumed that the IGMP is applied to the virtual machine system in FIG. 10. Specifically, the router 92 periodically transmits an IGMP query message to the servers 93A and 93B through the physical switch 91. The servers 93A and 93B transmit an IGMP Host Membership Report message in response to the IGMP query message. If the IGMP Host Membership Report message is a JOIN message, which indicates a delivery request, the physical switch 91 transmits a multicast packet to the server 93A or 93B from which the JOIN message is transmitted.

Figure 10:
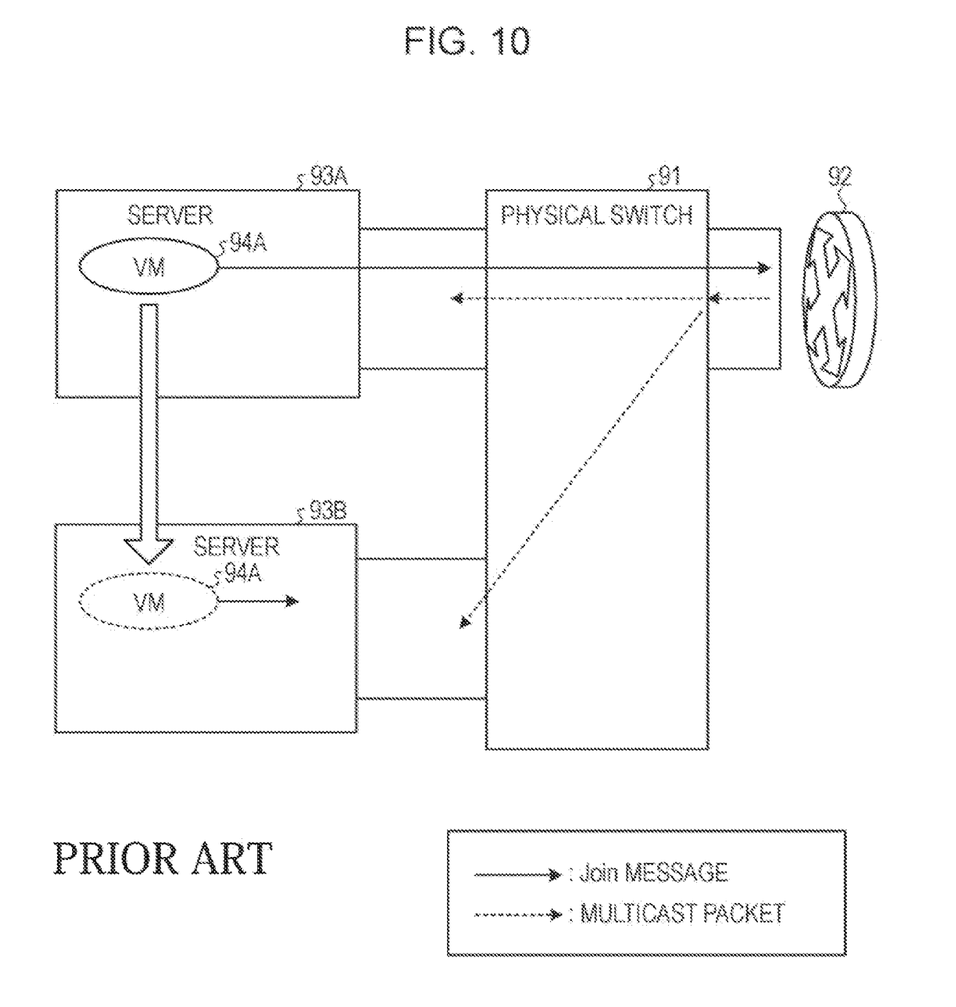
FIG. 10 is a diagram describing related art.

In the virtual machine system illustrated in FIG. 10, the server 93A transmits a JOIN message but the server 93B does not transmit a JOIN message. In other words, the server 93A receives a multicast packet but the server 93B does not receive a multicast packet. The live migration in which the physical machine on which the VM 94A operates is migrated from the server 93A to the server 93B is executed in such a state. In the above case, the VM 94A cannot receive a multicast message for a certain time after the live migration is completed. This is because the server 93B to which the VM 94A is migrated cannot receive a multicast message during a time after the server 93B receives an IGMP query message from the router 92 before the server 93B transmits a JOIN message in response to the IGMP query message.

The time interval when the IGMP query message is transmitted by the router 92 is generally, 60 seconds or 125 seconds. Accordingly, the VM 94A cannot receive a multicast message, for example, for 60 seconds or 125 seconds after the live migration is completed in the above case.

A technology in which a virtual switch included in a physical switch transmits a pseudo IGMP query message is also proposed in recent years in order to allow a multicast packet to be received after the live migration is completed. However, such a technology cannot be applied to a system that bypasses the virtual switch. For example, such a technology cannot be applied to a system that executes the live migration by direct input-output (I/O). It is difficult to apply such a technology also when the virtual switch is included in a network interface card (NIC) held in the physical machine.

SUMMARY

According to an embodiment of the application, a relay apparatus includes a destination storage unit configured to store information about a destination of a multicast packet in association with a multicast address; a determination unit configured to determine whether the destination of a multicast packet that is received is a first physical machine on the basis of the destination information stored in the destination storage unit in a migration process in which a virtual machine operating on the first physical machine is migrated to a second physical machine; and an addition unit configured to add information about the second physical machine to the destination information in the destination storage unit, corresponding to the multicast address the destination of which is the first physical machine, if the determination unit determines that the destination of the multicast packet is the first physical machine.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments of a relay apparatus, a virtual machine system, and a relay method according to the application is herein described in detail with reference to the attached drawings.

The relay apparatus, the virtual machine system, and the relay method according to the application are not restricted by the embodiments.

First Embodiment

Figure 1:
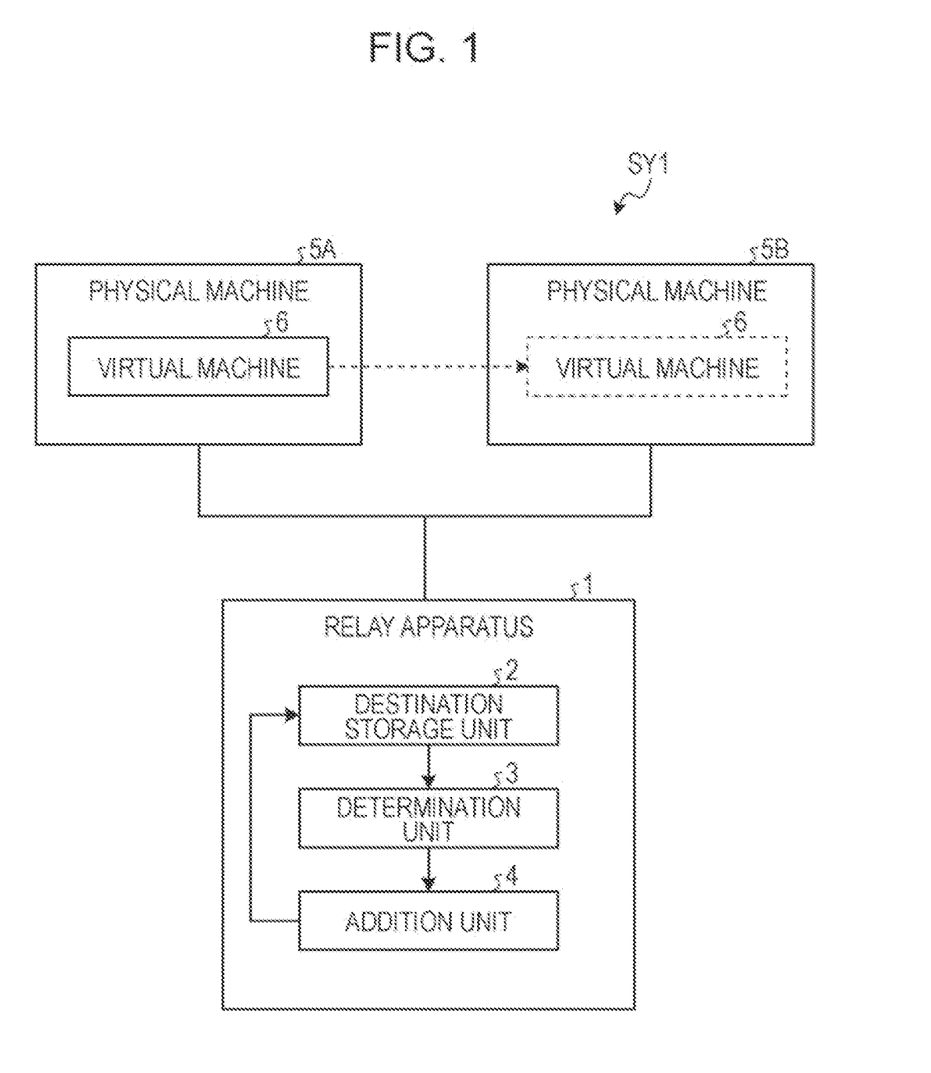
FIG. 1 is a block diagram showing an example of the configuration of a virtual machine system including a relay apparatus according to a first embodiment of the application.

The configuration of a relay apparatus according to a first embodiment of the application is described with reference to FIG. 1. FIG. 1 is a block diagram showing an example of the configuration of a virtual machine system including the relay apparatus according to the first embodiment. Referring to FIG. 1, a virtual machine system SY1 includes a relay apparatus 1 and physical machines 5A and 5B. A virtual machine 6 operates on the physical machine 5A.

It is assumed that the IGMP is applied to the virtual machine system SY1 shown in FIG. 1. It is also assumed that the live migration in which the physical machine on which the virtual machine 6 operates is migrated from the physical machine 5A to the physical machine 5B is executed in the virtual machine system SY1.

Referring to FIG. 1, the relay apparatus 1 includes a destination storage unit 2, a determination unit 3, and an addition unit 4. The destination storage unit 2 stores information about the destination of a multicast packet in association with a multicast address. For example, the destination storage unit 2 is a Media Access Control (MAC) address table and stores the port numbers, etc. for identifying ports of the relay apparatus 1 connected to the physical machine 5A and the physical machine 5B as the destination information.

The determination unit 3 determines whether the physical machine from which the virtual machine 6 is migrated (hereinafter referred to as source physical machine) is the destination of a multicast packet on the basis of the destination information stored in the destination storage unit 2 in the migration process in which the physical machine on which the virtual machine 6 operates is migrated to another physical machine.

The addition unit 4 adds information about the physical machine to which the virtual machine 6 is migrated (hereinafter referred to as a destination physical machine) to a multicast group the destination of which includes the source physical machine if the determination unit 3 determines that the source physical machine is one of the destinations of the multicast packet. Specifically, the addition unit 4 adds the information about the destination physical machine to the destination information stored in the destination storage unit 2 in association with the multicast address the destination of which includes the source physical machine.

In the example shown in FIG. 1, the live migration in which the physical machine on which the virtual machine 6 operates is migrated from the physical machine 5A to the physical machine 5B is executed. Accordingly, the determination unit 3 determines whether the physical machine 5A, which is the source physical machine of the virtual machine 6, is the destination of a multicast packet. The addition unit 4 adds information about the physical machine 5B to the destination information stored in the destination storage unit 2 in association with the multicast address the destination of which is the physical machine 5A because the physical machine 5A is one of the destinations of the multicast packet.

As described above, the relay apparatus 1 according to the first embodiment adds the destination physical machine to the multicast group to which the source physical machine belongs in the live migration. Accordingly, it is possible for the relay apparatus according to the first embodiment to transmit the multicast packet to the destination physical machine even immediately after the live migration is completed. In other words, the use of the relay apparatus 1 according to the first embodiment can prevent stop of transmission and reception of multicast packets to and from the destination physical machine even in the live migration.

Second Embodiment

The relay apparatus described above in the first embodiment is specifically described. An example in which a physical switch is used as the relay apparatus is described in a second embodiment of the application. A virtual machine belongs to a certain virtual network (hereinafter referred to as a "VLAN") in the example in the second embodiment.

Live Migration in Second Embodiment

Figure 2:
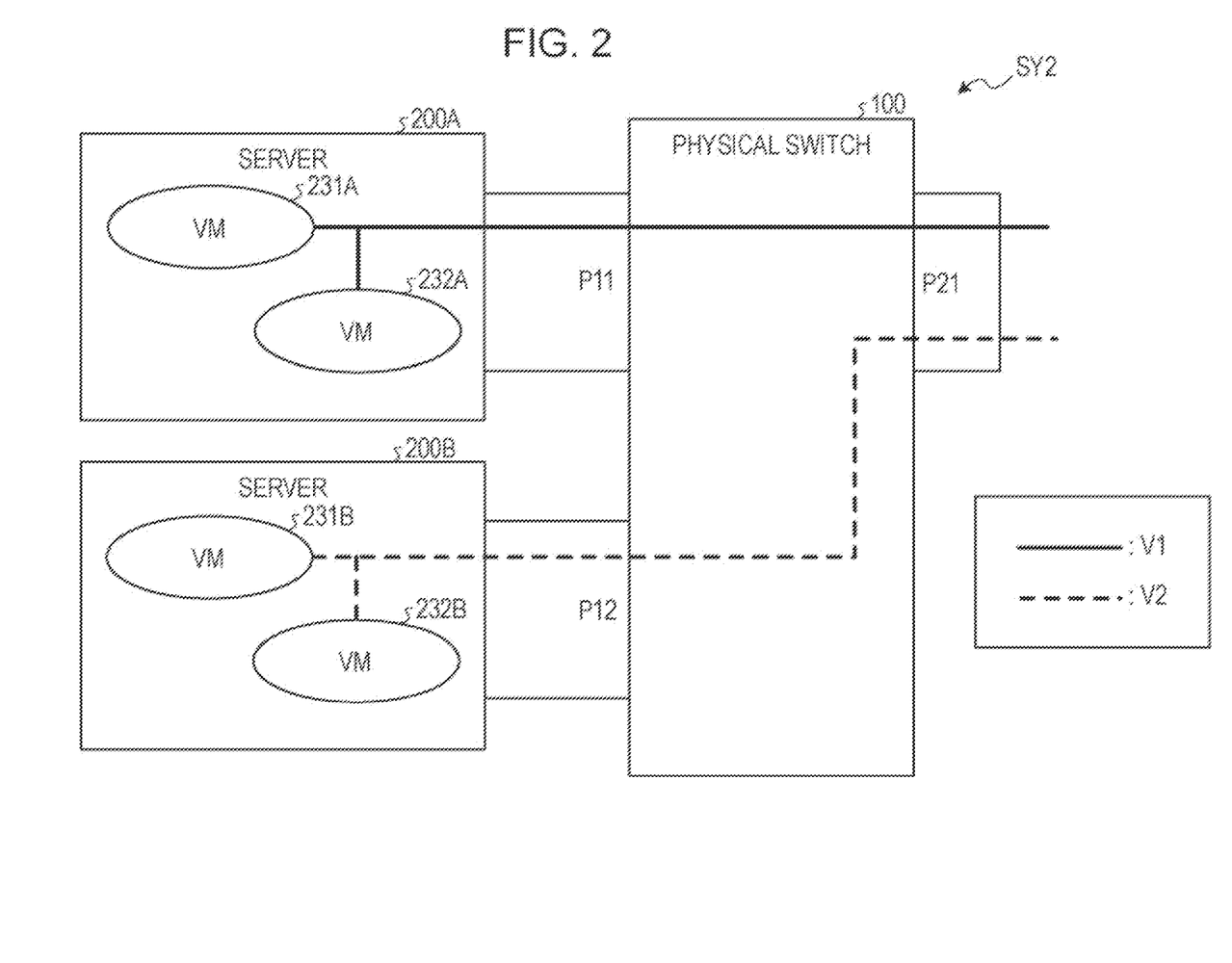
FIG. 2 illustrates an example of live migration executed in a virtual machine system according to a second embodiment of the application.
Figure 3:
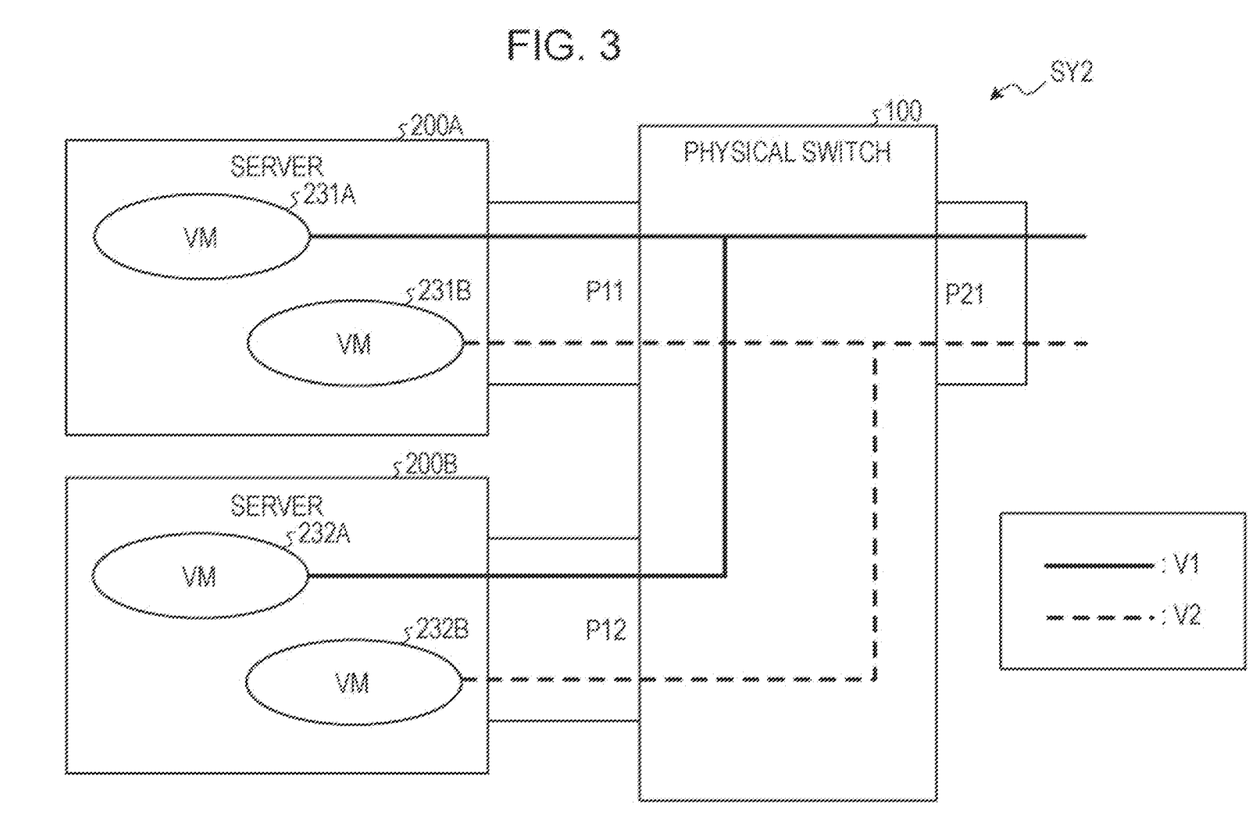
FIG. 3 illustrates another example of the live migration executed in the virtual machine system according to the second embodiment of the application.

An example of the live migration executed in a virtual machine system according to the second embodiment is described with reference to FIGS. 2 and 3. FIGS. 2 and 3 illustrate examples of the live migration executed in the virtual machine system according to the second embodiment. FIG. 2 illustrates an exemplary state of the virtual machine system before the live migration is executed. FIG. 3 illustrates an exemplary state of the virtual machine system after the live migration is executed.

Referring to FIG. 2, a virtual machine system SY2 according to the second embodiment includes a physical switch 100 and servers 200A and 200B. The physical switch 100 is connected to the server 200A via a port P11 and is connected to the server 200B via a port P12. The physical switch 100 is connected to an apparatus (not shown) (for example, a router) via a port P21.

The servers 200A and 200B are physical machines and provide various services. In the example in FIG. 2, a VM 231A and a VM 232A operate on the server 200A. A VM 231B and a VM 232B operate on the server 200B. The VM 231A and the VM 232A belong to a VLAN "V1" and the VM 231B and the VM 232B belong to a VLAN "V2" in the example in FIG. 2.

When the physical switch 100 receives, for example, a multicast packet whose multicast address is "MA11" in such a state, the physical switch 100 transmits the multicast packet to the server 200A through the port P11. When the physical switch 100 receives, for example, a multicast packet whose multicast address is "MA12" in such a state, the physical switch 100 transmits the multicast packet to the server 200B through the port P12.

If the live migration from the state in FIG. 2 to the state in FIG. 3 is executed in such a case, the VM 232A and the VM 231B cannot possibly receive the multicast packet for a certain time after the live migration is executed.

Specifically, the VM 232A operating on the server 200A is migrated to the server 200B, as shown in FIG. 3. Accordingly, the VM 232A cannot receive the multicast packet whose multicast address is "MA11" during a time period after the server 200B receives an IGMP query message before the server 200B transmits a JOIN message. The VM 231B operating on the server 200B is migrated to the server 200A. Accordingly, the VM 231B cannot receive the multicast packet whose multicast address is "MA12" during a time period after the server 200A receives an IGMP query message before the server 200A transmits a JOIN message.

In order to address the above situation, the physical switch 100 according to the second embodiment adds the server 200B to the multicast group whose multicast address is "MA11" upon start of the live migration in which the VM 232A is migrated from the server 200A to the server 200B. As a result, the physical switch 100 can transmit the multicast packet whose multicast address is "MA11" to the VM 232A upon completion of the live migration. In other words, the VM 232A can avoid the situation in which the VM 232A cannot receive the multicast packet for a certain time even after the live migration is executed.

In addition, the physical switch 100 according to the second embodiment adds the server 200A to the multicast group whose multicast address is "MA12" upon start of the live migration in which the VM 231B is migrated from the server 200B to the server 200A. As a result, the physical switch 100 can transmit the multicast packet whose multicast address is "MA12" to the VM 231B upon completion of the live migration. In other words, the VM 231B can avoid the situation in which the VM 231B cannot receive the multicast packet for a certain time even after the live migration is executed.

Configuration of Virtual Machine System According to Second Embodiment

Figure 4:
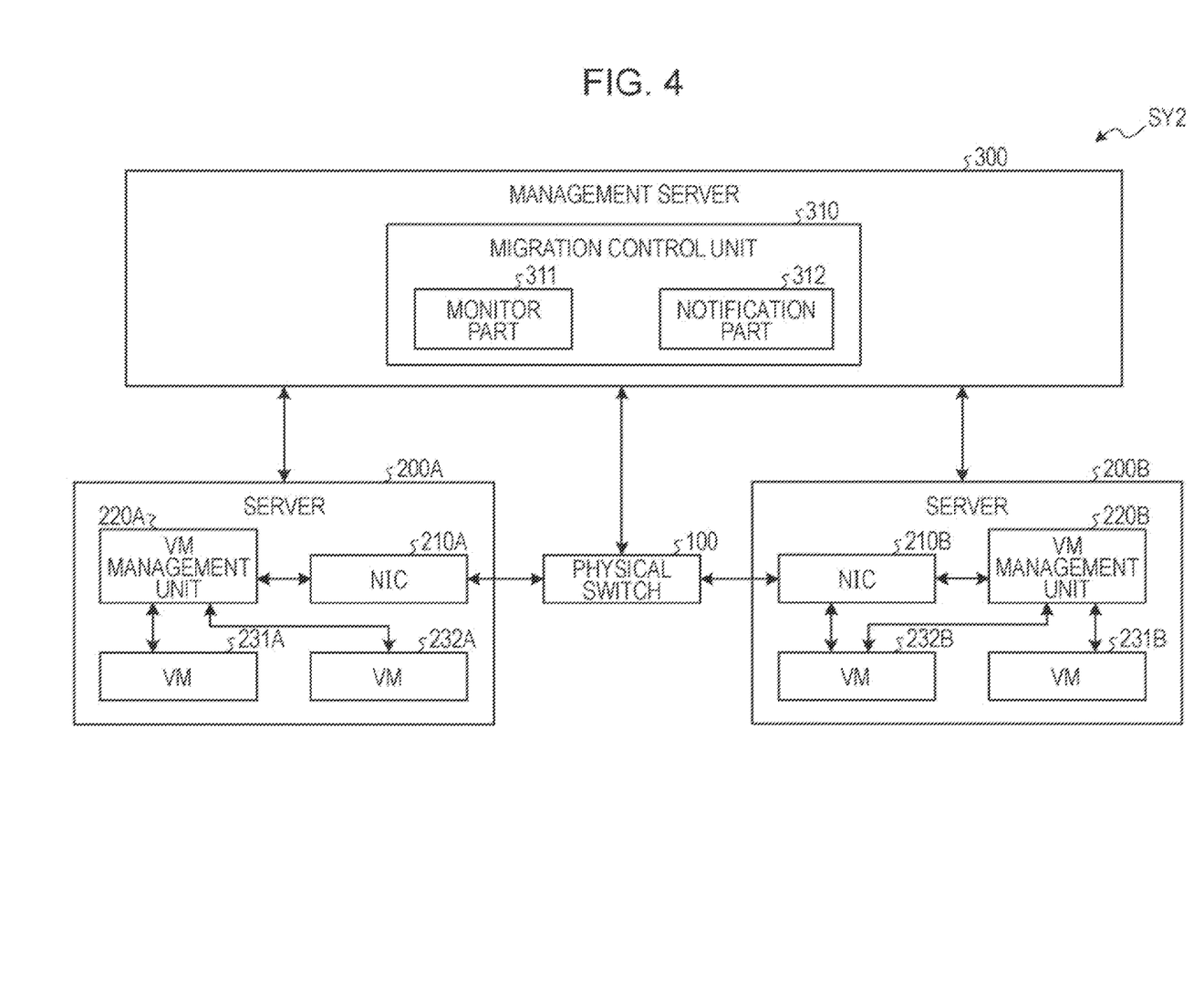
FIG. 4 is a block diagram showing an example of the configuration of the virtual machine system according to the second embodiment of the application.

The configuration of the virtual machine system according to the second embodiment is described with reference to FIG. 4. FIG. 4 is a block diagram showing an example of the configuration of the virtual machine system SY2 according to the second embodiment. Referring to FIG. 4, the virtual machine system SY2 includes the physical switch 100, the servers 200A and 200B, and a management server 300.

Although the virtual machine system SY2 includes one physical switch 100 in the example in FIG. 4, the number of the physical switches in the virtual machine system SY2 is not limited to one. Although the virtual machine system SY2 includes the two servers 200A and 200B in the example in FIG. 4, the number of the servers in the virtual machine system SY2 is not limited to two. For example, the virtual machine system SY2 may include two or more physical switches and/or three or more servers.

The physical switch 100 relays a variety of data exchanged between apparatuses. For example, the physical switch 100 relays a variety of data exchanged between the server 200A and the server 200B and relays a variety of data exchanged between the server 200A or 200B and a router, etc. (not shown). The configuration of the physical switch 100 is described below with reference to FIG. 5.

The server 200A includes an NIC 210A and a VM management unit 220A, and the VM 231A and the VM 232A operate on the server 200A. The server 200B includes an NIC 210B and a VM management unit 220B, and the VM 231B and the VM 232B operate on the server 200B.

The NICs 210A and 210B are interfaces used for exchanging a variety of data with an external apparatus. For example, the NICs 210A and 210B exchanges a variety of data with the physical switch 100.

The VM management units 220A and 220B manage the VMs. For example, the VM management unit 220A manages activation, stop, etc. of the VM 231A and the VM 232A. In addition, for example, the VM management unit 220A controls the live migration in which the physical machine on which the VM 231A and the VM 232A operate is migrated to another server (for example, the server 200B).

The management server 300 is a virtual machine system management apparatus that manages the VMs operating in the virtual machine system SY2. The management server 300 includes a migration control unit 310, as shown in FIG. 4. The management server 300 may include, for example, an input unit used for receiving a variety of information and a display unit used for displaying a variety of information, although they are not shown in FIG. 4.

The migration control unit 310 controls the execution of the live migration. Specifically, the migration control unit 310 includes a monitor part 311 and a notification part 312.

The monitor part 311 performs a variety of processing concerning the live migration. Specifically, the monitor part 311 performs a monitoring process to determine whether the live migration in which the server on which the VM operates is migrated to another server is to be executed. For example, the monitor part 311 detects that the live migration is to be executed if an operation to execute the live migration is performed by, for example, a manager. If the monitor part 311 detects that the live migration is to be executed, the monitor part 311 acquires information about the VM to be migrated, the source server, the destination server, and so on. Then, the monitor part 311 instructs the VM management unit 220A or 220B in the source server to execute the live migration. As described above, the monitor part 311 operates as a monitoring part that determines whether the live migration is to be executed.

If the monitor part 311 detects that the live migration is to be executed, the notification part 312 notifies the physical switch 100 of a command including information about the source server, the destination server, and the VLAN to which the VM to be migrated belongs. The command indicated to the physical switch 100 by the notification part 312 is hereinafter sometimes referred to as an "IGMP command". Such an IGMP command is represented by, for example, the following format:

igmpsnooping migrate<from port> <to port> [vid]    (1)

In the IGMP command in (1), the port number indicating a port of the physical switch 100 to which the source server of the VM is connected is set in <from port>. The port number indicating a port of the physical switch 100 to which the destination server of the VM is connected is set in <to port>. The VLAN number identifying a VLAN to which the VM to be migrated belongs is set in [vid]. [Vid] is information that is arbitrarily set and the VLAN number may not be set in [vid].

For example, in the example in FIG. 2, the server 200A on which the VM 232A operates is connected to the port P11 of the physical switch 100. The server 200B is connected to the port P12 of the physical switch 100. As shown in the example in FIG. 3, the VM 232A belonging to the VLAN having the VLAN number "V1" is migrated from the server 200A to the server 200B. In this case, the notification part 312 notifies the physical switch 100 of the following IGMP command (2):

igmpsnooping migrate P11 P12 V1    (2)

The physical switch 100, which receives the IGMP command (2), acquires information indicating that the VM belonging to the VLAN having the VLAN number "V1" is migrated from the server 200A connected to the port P11 to the server 200B connected to the port P12. The reference numeral given to each port indicates the port number of the port in the following description. For example, the port number of the port P11 is "P11" and the port number of the port P12 is "P12."

Multiple pieces of information may be set in the items <from port>, <to port>, and [vid] in the IGMP command. Specifically, multiple pieces of information delimited by certain symbols, letters, etc. may be set in each item. In the following exemplary IGMP command (3), multiple pieces of information are set in <from port>, <to port>, and [vid]:

igmpsnooping migrate Pf1, Pf2, Pt1, Pt2, Vz1, Vz2 tm    (3)

In the exemplary IGMP command (3), the N-th pieces of information in the items correspond to each other. Specifically, <from port>="Pf1", <to port>="Pt1", and [vid]="Vz1" correspond to each other, and <from port>="Pf2", <to port>="Pt2", and [vid]="Vz2" correspond to each other. In other words, the IGMP command (3) indicates that the VM belonging to the VLAN having the VLAN number "Vz1" is migrated from the server connected to the port "Pf1" to the server connected to the port "Pt1" and that the VM belonging to the VLAN having the VLAN number "Vz2" is migrated from the server connected to the port "Pf2" to the server connected to the port "Pt2." Although the ";" is used as the delimiter in the IGMP command (3), the delimiter may be another symbol or letter, such as ":", "+", "−", or "/."

In the example in FIG. 4, the notification part 312 holds information indicating the connection relationship between the ports of the physical switch 100 and the servers. For example, the notification part 312 holds information indicating that the server 200A is connected to the port P11 of the physical switch 100 and the server 200B is connected to the port P12 of the physical switch 100. As described above, the notification part 312 operates as a notification part that notifies the relay apparatus of the source server and the destination server of the VM.

The VM management units 220A and 220B, the monitor part 311, and the notification part 312 described above are, for example, electronic circuits. The electronic circuit means, for example, an integrated circuit, such as an Application Specific Integrated Circuit (ASIC) or a Field Programmable Gate Array (FPGA); a central processing unit (CPU); or a micro processor unit (MPU).

Configuration of Physical Switch in Second Embodiment

Figure 5:
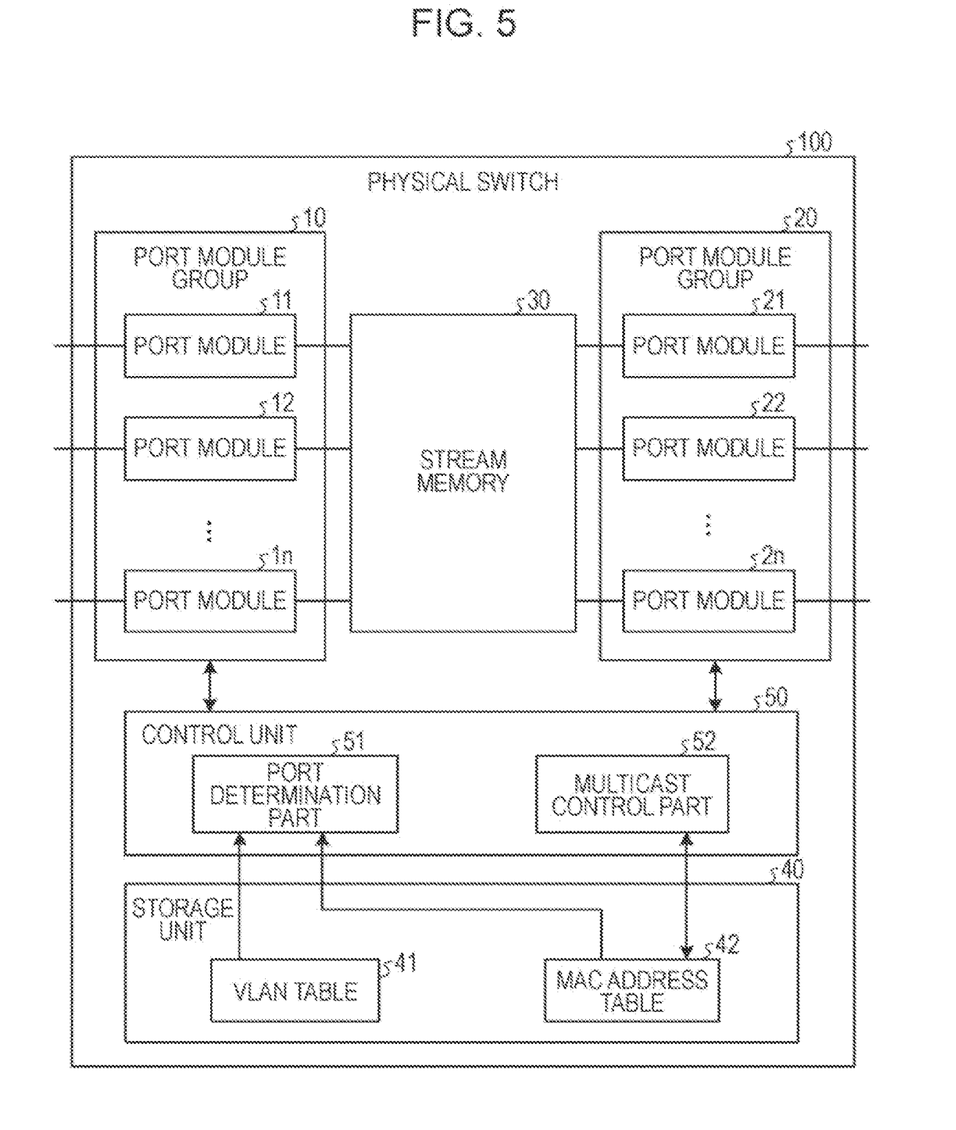
FIG. 5 is a block diagram showing an example of the configuration of a physical switch in the second embodiment of the application.

The configuration of the physical switch 100 in the second embodiment is described with reference to FIG. 5. FIG. 5 is a block diagram showing an example of the configuration of the physical switch 100 in the second embodiment. Referring to FIG. 5, the physical switch 100 includes port module groups 10 and 20, a stream memory 30, a storage unit 40, and a control unit 50.

The port module group 10 includes port modules 11 to 1n. The port module group 20 includes port modules 21 to 2n. Each of the port modules 11 to in and 21 to 2n stores a packet externally input into the physical switch 100 in the stream memory 30. At this time, each of the port modules 11 to 1n and 21 to 2n supplies header information about the packet stored in the stream memory 30 to the control unit 50. The "header information" indicates, for example, a destination address (DA), a source address (SA), and a VLAN number included in the packet.

Each of the port modules 11 to 1n and 21 to 2n reads out the packet stored in the stream memory 30 to externally supply the readout packet. Specifically, each of the port modules 11 to in and 21 to 2n determines the packet, etc. to be read out from the stream memory 30 in accordance with an instruction from the control unit 50, described below.

The port modules 11 to in and 21 to 2n are provided for the respective ports. In the example in FIG. 5, the port module 11 transmits and receives data through the port P11 and the port module 12 transmits and receives data through the port P12. The port module 21 transmits and receives data through the port module 21.

The stream memory 30 is a storage device that stores a variety of information. The stream memory 30 stores packets written through the port modules 11 to 1n and 21 to 2n. The packets in the stream memory 30 are read out through the port modules 11 to in and 21 to 2n. The stream memory 30 includes a storage area that is divided into each logical block of a certain size and stores data in each logical block.

Figure 6:
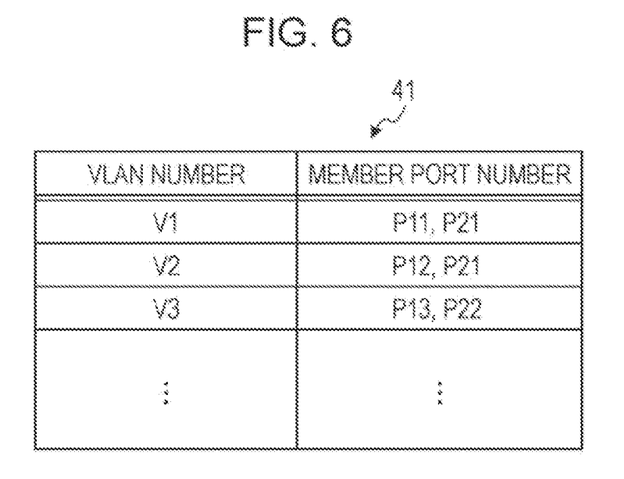
FIG. 6 shows an example of a virtual local area network (VLAN) table.

The storage unit 40 is a storage device that stores a variety of information. The storage unit 40 includes a VLAN table 41 and a MAC address table 42. The VLAN table 41 stores configuration information about the VLANs. FIG. 6 shows an example of the VLAN table 41. As shown in FIG. 6, the VLAN table 41 includes items including "VLAN number" and "member port number."

The "VLAN number" indicates the number that identifies each VLAN. The "member port number" indicates the port number of ports through which packets delivered on the VLAN indicated by the VLAN number are transmitted and received.

For example, the VLAN table 41 shown in FIG. 6 indicates that apparatuses connected to the port P11 and the port P21 belong to the VLAN having the VLAN number "V1" and that apparatuses connected to the port P12 and the port P21 belong to the VLAN having the VLAN number "V2."

Figure 7:
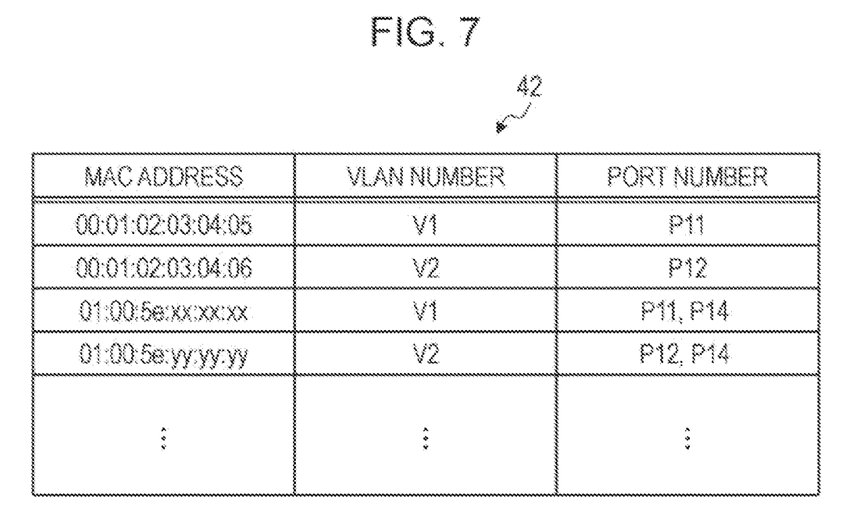
FIG. 7 shows an example of a media access control (MAC) address table.

The MAC address table 42 stores the VLAN number of the VLAN to which the apparatus receiving each packet belong and the output port of the packet, in association with the destination of the packet. FIG. 7 shows an example of the MAC address table 42. As shown in FIG. 7 the MAC address table 42 includes items including "MAC address", "VLAN number", and "port number".

The "MAC address" is information indicating the destination of each packet. For example, the "MAC address" is set in the DA of the packet header. The "VLAN number" indicates the VLAN number of the VLAN to which the apparatus, which is the destination of each packet, belongs. The "port number" indicates the port number of the port to which the apparatus indicated by each MAC address is connected. Among the MAC addresses in FIG. 7, MAC addresses beginning with "01:00:5e" indicate multicast addresses. The MAC address table 42 corresponds to the destination storage unit 2 in FIG. 1.

For example, the MAC address table 42 in FIG. 7 indicates that the apparatus receiving a packet for an MAC address "00:01:02:03:04:05" belongs to the VLAN having the VLAN number "V1" and that the packet whose DA is set to the MAC address "00:01:02:03:04:05" is output through the port P11.

The MAC address table 42 in FIG. 7 also indicates that the apparatus receiving a packet for an MAC address "01:00:5e:xx:xxm" belongs to the VLAN having the VLAN number "V1" and that the packet whose DA is set to the MAC address "01:00:5e:xx:xxm" is output through the ports P11 and P14.

The MAC address table 42 in FIG. 7 also indicates that the apparatus receiving a packet for an MAC address "01:00:5e:yy:yy:yy" belongs to the VLAN having the VLAN number "V2" and that the packet whose DA is set to the MAC address "01:00:5e:yy:yy:yy" is output through the ports P12 and P14.

The control unit 50 controls the entire physical switch 100 and includes a port determination part 51 and a multicast control part 52. The port determination part 51 determines the destination of a packet received from outside of the physical switch 100 on the basis of the information stored in the VLAN table 41 and the MAC address table 42.

Specifically, upon reception of header information through the port module group 10 or 20, the port determination part 51 acquires the port number corresponding to the DA set in the header information from the MAC address table 42. The port indicated by the acquired port number corresponds to the output port of the packet having the header information. Then, the port determination part 51 determines whether the port number acquired from the MAC address table 42 and the port number of the port through which the packet is received belong to the same VLAN on the basis of the information stored in the VLAN table 41.

If the port number acquired from the MAC address table 42 and the port number of the port through which the packet is received do not belong to the same VLAN, the port determination part 51 does not relay the packet having the header information to other apparatuses. If the port number acquired from the MAC address table 42 and the port number of the port through which the packet is received belong to the same VLAN, the port determination part 51 generates a logical block number indicating the logical block in which the packet having the input header information is stored and an instruction (hereinafter referred to as a "relay process instruction" including the header information. The port determination part 51 outputs the generated relay process instruction through any of the port modules 11 to 1n and 21 to 2n connected to the output port of the packet.

The port modules 11 to 1n and 21 to 2n described above have multiple queues in which the relay process instructions supplied from the port determination part 51 are stored. The port modules 11 to 1n and 21 to 2n output the packets stored in the stream memory 30 through ports (not shown) in accordance with the relay process instructions supplied from the port determination part 51.

The multicast control part 52 updates the MAC address table 42 in accordance with an IGMP command notified from the notification part 312 in FIG. 4. Specifically, upon reception of an IGMP command, the multicast control part 52 determines whether the source server is the destination of a multicast packet by using <from port> and [vid] set in the received IGMP command. If the source server is the destination of the multicast packet, the multicast control part 52 adds <to port> set in the IGMP command to the multicast group the destination of which is the source server.

For example, the multicast control part 52 acquires an MAC address meeting all the following conditions (A) to (C) from the MAC address table 42. However, if no VLAN number is set in [vid] in the IGMP command, the multicast control part 52 excludes the condition (C) and acquires an MAC address meeting the conditions (A) and (B) from the MAC address table 42.

(A) The beginning of the MAC address is "01:00:5e."
(B) The corresponding port number(s) includes the port number set in <from port> in the IGMP command.
(C) The corresponding VLAN number coincides with the VLAN number set in [vid] in the IGMP command.

If an MAC address meeting the conditions can be acquired, the multicast control part 52 adds the port number set in <to port> in the IGMP command to the "port number" in the MAC address table 42 corresponding to the acquired MAC address. When multiple MAC addresses are acquired from the MAC address table 42, the multicast control part 52 adds the port number set in <to port> in the IGMP command to the "port number" corresponding to each MAC address. If no MAC address meeting the conditions can be acquired, the multicast control part 52 terminates the process.

The multicast control part 52 does not delete the source server from the multicast group. This is because the source server does not transmit a JOIN message if another VM belonging to the multicast group does not operate on the source server and, thus, the source server is deleted from the multicast group. If another VM belonging to the multicast group operates on the source server, no problem occurs because the source server transmits a JOIN message and a multicast packet is delivered to the other VM.

A MAC address meeting the conditions (A) to (C) or the conditions (A) and (B) is acquired to determine whether the source server is the destination of a multicast packet in the above description. However, the multicast control part 52 may determine whether the source server is the destination of a multicast packet by another process.

For example, the multicast control part 52 may acquire a MAC address meeting the conditions (B) and (C) from the MAC address table 42. Alternatively, if no VLAN number is set in [vid] in the IGMP command, the multicast control part 52 may acquire a MAC address meeting the condition (B) from the MAC address table 42. In such a case, the multicast control part 52 determines whether the beginning of the acquired MAC address is "01:00:5e." If the beginning of the MAC address is "01:00:5e", the multicast control part 52 determines that the source server is the destination of the multicast packet. If the beginning of the MAC address is not "01:00:5e", the multicast control part 52 determines that the source server is not the destination of the multicast packet.

After acquiring a combination of the MAC address, the VLAN number, and the port number(s) from the MAC address table 42, the multicast control part 52 may determine whether a MAC address meeting all the conditions (A) to (C) exists in the acquired combination. Alternatively, if no VLAN number is set in [vid] in the IGMP command, the multicast control part 52 may determine whether a MAC address meeting the conditions (A) and (B) exists in the acquired combination.

An exemplary process by the multicast control part 52 is described by using a specific example of the IGMP command received from the notification part 312. It is assumed in the following description that the MAC address table 42 is in the state shown in FIG. 7. It is also assumed that the multicast control part 52 receives the following IGMP command (4):

$$\text{igmpsnooping migrate P11 P12} \qquad (4)$$

The IGMP command (4) indicates that the VM is migrated from the server 200A connected to the port P11 to the server 200B connected to the port P12. Upon reception of the IGMP command (4), the multicast control part 52 acquires a MAC address the beginning of which is "01:00:5e" and the port number(s) of which includes "P11" from the MAC address table 42.

In the example in FIG. 7, the MAC address table 42 stores the MAC address "01:00:5e:xx:xx:xx" in association with the port numbers "P11, P14." Accordingly, the multicast control part 52 acquires the MAC address "01:00:5e:xx:xx:xx" from the MAC address table 42. The multicast control part 52 adds the port P12 connected to the destination server 200B to the multicast group to which the source server 200A belongs. Specifically, the multicast control part 52 updates the port numbers corresponding to the MAC address "01:00:5e:xx:xx:xx" in the MAC address table 42 from "P11, P14" to "P11, P14, P12." This allows the server 200B to receive the multicast packet the destination of which is "01:00:5e:xx:xx:xx" even immediately after the VM operating on the server 200A is migrated to the server 200B.

Then, it is assumed that the multicast control part 52 receives the following IGMP command (5):

$$\text{igmpsnooping migrate P11 P12 V1} \qquad (5)$$

The IGMP command (5) differs from the IGMP command (4) in that the VLAN number "V1" is set in [vid]. Upon reception of the IGMP command (5), the multicast control part 52 acquires a MAC address the beginning of which is "01:00:5e", the port number(s) of which includes "P11", and the VLAN number of which is "V1" from the MAC address table 42.

In the example in FIG. 7, the MAC address table 42 stores the MAC address "01:00:5e:xx:xx:xx" in association with the VLAN number "V1" and the port numbers "P11, P14." Accordingly, the multicast control part 52 acquires the MAC address "01:00:5e:xx:xx:xx" from the MAC address table 42. The multicast control part 52 updates the port numbers corresponding to the MAC address "01:00:5e:xx:xx:xx" in the MAC address table 42 from "P11, P14" to "P11, P14, P12."

Then, it is assumed that the multicast control part 52 receives the following IGMP command (6):

$$\text{igmpsnooping migrate P11, P12 P15, P15, V1, V2} \quad (6)$$

In the IGMP command (6), "P11, P12" are set in <from port>, "P15, P15" are set in <to port>, and "V1, V2" are set in [vid]. Upon reception of the IGMP command (6), the multicast control part 52 acquires a MAC address the beginning of which is "01:00:5e", the port number(s) of which includes "P11", and the VLAN number of which is "V1" from the MAC address table 42.

In the example in FIG. 7, the MAC address table 42 stores the MAC address "01:00:5e:xx:xx:xx" in association with the VLAN number "V1" and the port numbers "P11, P14." Accordingly, the multicast control part 52 acquires the MAC address "01:00:5e:xx:xx:xx" from the MAC address table 42. The multicast control part 52 updates the port numbers corresponding to the MAC address "01:00:5e:xx:xx:xx" in the MAC address table 42 from "P11, P14" to "P11, P14, P15."

Upon reception of the IGMP command (6), the multicast control part 52 also acquires a MAC address the beginning of which is "01:00:5e", the port number(s) of which includes "P12", and the VLAN number of which is "V2" from the MAC address table 42.

In the example in FIG. 7, the MAC address table 42 stores the MAC address "01:00:5e:yy:yy:yy" in association with the VLAN number "V2" and the port numbers "P12, P14." Accordingly, the multicast control part 52 acquires the MAC address "01:00:5e:yy:yy:yy" from the MAC address table 42. The multicast control part 52 updates the port numbers corresponding to the MAC address "01:00:5e:yy:yy:yy" in the MAC address table 42 from "P12, P14" to "P12, P14, P15."

As described above, when multiple pieces of information are set in the respective items of an IGMP command, the multicast control part 52 determines whether the source server is the destination of a multicast packet for every combination of <from port>, <to port>, and [vid]. The multicast control part 52 may determine whether the source server is the destination of a multicast packet after acquiring a MAC address, a VLAN number, and a port number (port numbers) from the MAC address table 42, as described above. When multiple pieces of information are set in the respective items of the IGMP command, the multicast control part 52 may use the information acquired from the MAC address table 42 to perform the determination process to all the combinations set for the IGMP command. Such a process is described by using an example. It is assumed here that the multicast control part 52 receives the IGMP command (6).

In this case, the multicast control part 52 acquires a MAC address, a VLAN number, and a port number from the MAC address table 42 shown in FIG. 7. For example, the multicast control part 52 performs the determination process to the combination of the MAC address "00:01:02:03:04:05", the VLAN number "V1", and the port number "P11", acquired from the MAC address table 42. Specifically, the multicast control part 52 determines whether the beginning of the MAC address is "01:00:5e", the port number includes "P11", and the VLAN number is "V1" in the combination. The multicast control part 52 determines here that the conditions (A) to (C) are not met. The multicast control part 52 also determines whether the beginning of the MAC address is "01:00:5e", the port number includes "P12", and the VLAN number is "V2" in the combination. The multicast control part 52 determines here that the conditions (A) to (C) are not met.

Then, the multicast control part 52 performs the determination process to the combination of the MAC address "00: 01:02:03:04:06", the VLAN number "V2", and the port number "P12", acquired from the MAC address table 42. Specifically, the multicast control part 52 determines whether the beginning of the MAC address is "01:00:5e", the port number includes "P11", and the VLAN number is "V1" in the combination. The multicast control part 52 also determines whether the beginning of the MAC address is "01:00:5e", the port number includes "P12", and the VLAN number is "V2" in the combination. The multicast control part 52 determines here that the conditions (A) to (C) are not met.

Then, the multicast control part 52 performs the determination process to the combination of the MAC address "01: 00:5e:xx:xxm", the VLAN number "V1", and the port numbers "P11, P14", acquired from the MAC address table 42. Specifically, the multicast control part 52 determines whether the beginning of the MAC address is "01:00:5e", the port numbers include "P11", and the VLAN number is "V1" in the combination. The multicast control part 52 determines here that the conditions (A) to (C) are met and acquires the MAC address "01:00:5e:xx:xx:xx." The multicast control part 52 also determines whether the beginning of the MAC address is "01:00:5e", the port numbers include "P12", and the VLAN number is "V2" in the combination. The multicast control part 52 determines here that the conditions (A) to (C) are not met.

As described above, the multicast control part 52 determines whether the multiple combinations set in the IGMP command meet the conditions (A) to (C) for every record acquired from the MAC address table 42. Since it is not needed for the multicast control part 52 to acquire the variety of information from the MAC address table 42 multiple times even when the multiple pieces of information are set in the IGMP command, it is possible to perform the process at high speed.

The multicast control part 52 described above corresponds to the determination unit 3 and the addition unit 4 shown in FIG. 1. The port modules 11 to in and 21 to 2n and the control unit 50 in FIG. 5 are, for example, electronic circuits. The electronic circuit means, for example, an integrated circuit, such as an ASIC or a FPGA, a CPU, or a MPU. The stream memory 30 and the storage unit 40 in FIG. 5 are, for example, storage devices including a random access memory (RAM) and a flash memory.

[Process by Management Server]

Figure 8:
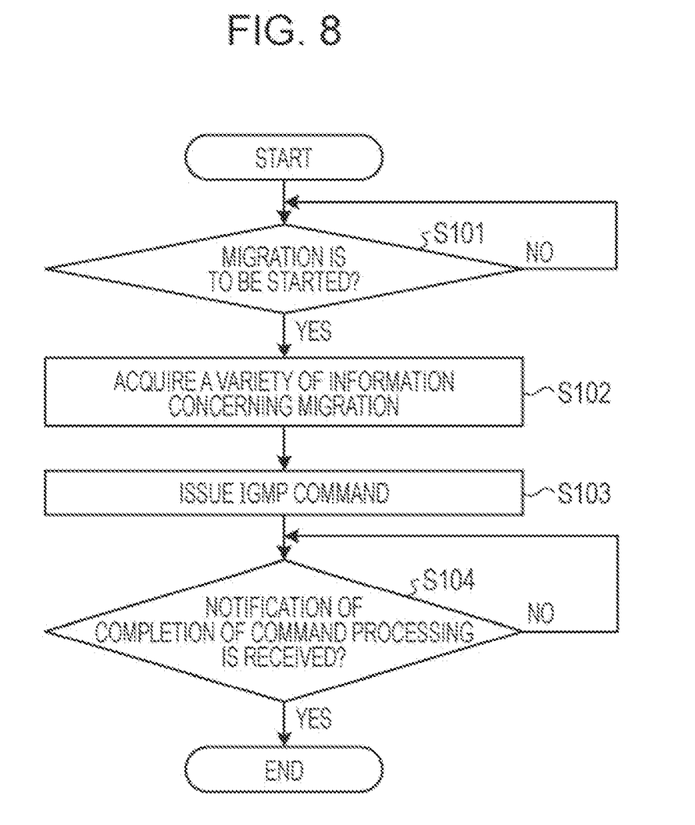
FIG. 8 is a flowchart showing an example of a process performed by a management server in the second embodiment.

A process performed by the management server 300 in the second embodiment is described with reference to FIG. 8. FIG. 8 is a flowchart showing an example of the process performed by the management server 300 in the second embodiment.

Referring to FIG. 8, in Step S101, the migration control unit 310 in the management server 300 determines whether the live migration is to be started. For example, the migration control unit 310 determines that the live migration is to be started if an operation to execute the live migration is performed by, for example, the manager.

If the live migration is to be started (YES in Step S101), in Step S102, the monitor part 311 in the migration control unit 310 acquires a variety of information concerning the live migration. For example, the monitor part 311 acquires information about the VM to be migrated, the source server, the destination server, etc. on the basis of the information input by, for example, the manager.

In Step S103, the notification part 312 in the migration control unit 310 issues an IGMP command to the physical switch 100 on the basis of the source server, the destination server, etc. acquired by the monitor part 311.

In Step S104, the migration control unit 310 determines whether a notification of completion of the processing for the IGMP command is received from the physical switch 100. If a notification of completion of the processing for the IGMP command is received from the physical switch 100 (YES in Step S104), the process is terminated.

Process by Physical Switch

Figure 9:
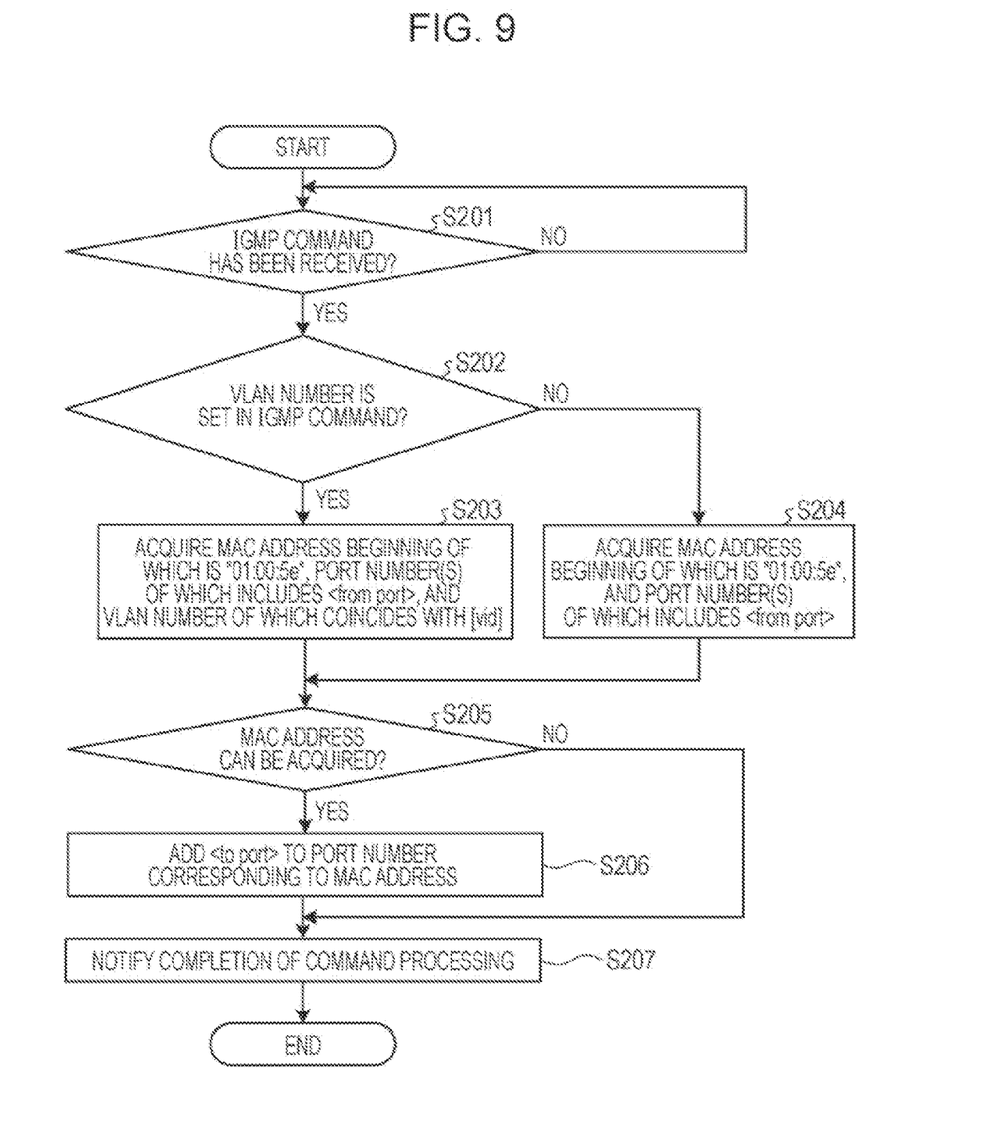
FIG. 9 is a flowchart showing an example of a process performed by a physical switch in the second embodiment.

A process performed by the physical switch 100 in the second embodiment is described with reference to FIG. 9. FIG. 9 is a flowchart showing an example of the process performed by the physical switch 100 in the second embodiment.

Referring to FIG. 9, in Step S201, the multicast control part 52 in the physical switch 100 determines whether an IGMP command has been received from the notification part 312 in the management server 300. If an IGMP command has been received from the notification part 312 (YES in Step S201), in Step S202, the multicast control part 52 determines whether a VLAN number is set in [vid] in the IGMP command.

If a VLAN number is set in the IGMP command (YES in Step S202), in Step S203, the multicast control part 52 acquires a MAC address meeting all the conditions (A) to (C) from the MAC address table 42. Specifically, the multicast control part 52 acquires a MAC address the beginning of which is "01:00:5e", the port number(s) of which includes the port number set in <from port>, the VLAN number of which coincides with the VLAN number set in [vid].

If a VLAN number is not set in the IGMP command (NO in Step S202), in Step S204, the multicast control part 5 acquires a MAC address meeting the conditions (A) and (B) from the MAC address table 42. Specifically, the multicast control part 52 acquires a MAC address the beginning of which is "01:00:5e" and the port number(s) of which includes the port number set in <from port>.

In Step S205, the multicast control part 52 determines whether a MAC address can be acquired from the MAC address table 42. If a MAC address can be acquired from the MAC address table 42 (YES in Step S205), in Step S206, the multicast control part 52 adds the port number set in <to port> to the port number corresponding to the MAC address in the MAC address table 42. When multiple MAC addresses are acquired from the MAC address table 42, the multicast control part 52 adds the port number set in <to port) to the port number corresponding to each MAC address. In Step S207, the multicast control part 52 transmits a notification of completion of the processing for the IGMP command to the management server 300. Then, the process is terminated.

If a MAC address cannot be acquired from the MAC address table 42 (NO in Step S205), Step S206 is skipped. In Step S207, the multicast control part 52 transmits a notification of completion of the processing for the IGMP command to the management server 300. Then, the process is terminated.

Advantages of Second Embodiment

As described above, in the virtual machine system SY2 according to the second embodiment, the management server 300 notifies the physical switch 100 of an IGMP command when the live migration is performed. The physical switch 100 adds the destination server to the multicast group to which the source server belongs in accordance with the IGMP command. The virtual machine system SY2 according to the second embodiment can add the destination server to the multicast group to which the source server belong in the above manner upon start of the live migration. In other words, the virtual machine system SY2 according to the second embodiment can transmit a multicast packet to the destination server even immediately after the live migration is completed.

As a result, the virtual machine system SY2 according to the second embodiment can prevent stop of transmission and reception of multicast packets to the destination server immediately after the live migration is completed.

In addition, in the virtual machine system SY2 according to the second embodiment, the management server 300 notifies the physical switch 100 of an IGMP command including the VLAN number. The physical switch 100 uses the source server and the VLAN number set in the IGMP command to add the destination server to the multicast group to which the source server belongs. Accordingly, in the virtual machine system SY2 according to the second embodiment, the physical switch 100 can add the destination server to the multicast address for every combination of a source server and a VLAN.

Third Embodiment

The relay apparatus, etc, according to the application may be embodied in various modes, in addition to the embodiments described above. Accordingly, other embodiments of the relay apparatus, etc. according to the application are described as a third embodiment.

Processing Timing

In the second embodiment described above, the management server 300 notifies the physical switch 100 of an IGMP command if the management server 300 detects that the live migration is to be executed, and the physical switch 100 adds the destination server to the multicast group in accordance with the IGMP command. However, the management server 300 may notify the physical switch 100 of an IGMP command immediately after the live migration is completed. In this case, the physical switch 100 adds the destination server to the multicast group immediately after the live migration is completed. As described above, the virtual machine system can prevent stop of transmission and reception of multicast packets to and from the destination server even when the addition is performed upon completion of the live migration.

System Configuration, etc.

The components in each apparatus described above with reference to the drawings are functional and conceptual ones and are not necessarily physically configured in the manners illustrated in the drawings. In other words, the specific modes of division and integration of each apparatus are not limited to the ones illustrated in the drawings, and all or part of the specific modes may be functionally or physically divided or integrated in arbitrary units in accordance with various loads or usage. For example, in the physical switch 100 shown in FIG. 5, the multicast control part 52 may be divided into a subpart corresponding to the determination unit 3 in FIG. 1 and a subpart corresponding to the addition unit 4 in FIG. 1.

Among the processes described in the above embodiments, all or part of the processes that are described to be automatically executed may be manually executed. Alternatively, all or part of the processes that are described to be manually executed may be automatically executed by known methods. For example, the example in which the live migration is executed in response to an operation by the manager, etc. is described in the second embodiment. However, the management server 300 may start to execute the predetermined live migration at a certain time during batch processing or the like.

All or part of each processing function executed in each apparatus may be realized by a CPU and programs that are analyzed and executed by the CPU or may be realized by hardware (wired logic).

What is claimed is:

1. A relay apparatus comprising: a processor; and a memory, the processor being coupled to the memory and configured to: store destination information about a destination of a multicast packet in association with a multicast address; determine whether the destination of the multicast packet is a first physical machine on the basis of the destination information stored in a migration process in which a virtual machine operating on the first physical machine is migrated to a second physical machine; and add information about the second physical machine to the destination information the destination information corresponding to the multicast address that indicates the destination of the first physical machine, if the determination determines that the destination of the multicast packet is the first physical machine, wherein the relay apparatus is notified of the information about the first physical machine, the information about the second physical machine, and a virtual network number for identifying a virtual network to which the virtual machine belongs if the determination determines that the migration process is to be executed, wherein the multicast address and the destination information is stored in association with the virtual network number of the virtual network to which the first physical machine, which is the destination of the multicast packet, belongs, wherein the determination determines whether the multicast address corresponding to a combination of the first physical machine and the virtual network number is stored, and wherein the information about the second physical machine is added to the destination information, corresponding to a multicast address, if the determination determines that the multicast address corresponding to the combination of the first physical machine and the virtual network number is stored.

2. A relay apparatus comprising: a memory configured to store destination information about a destination of a multicast packet in association with a multicast address; and
a processor configured to execute a procedure, the procedure comprising: determining whether the destination of the multicast packet is a first physical machine on the basis of the destination information stored in the memory in a migration process in which a virtual machine operating on the first physical machine is migrated to a second physical machine; and adding information about the second physical machine to the destination information in the memory, the destination information corresponding to the multicast address that indicates the destination of the first physical machine, if the determining determines that the destination of the multicast packet is the first physical machine,
wherein the relay apparatus is notified of the information about the first physical machine, the information about the second physical machine, and a virtual network number for identifying a virtual network to which the virtual machine belongs if the determining determines that the migration process is to be executed, wherein the multicast address and the destination information are stored in association with the virtual network number of the virtual network to which the first physical machine, which is the destination of the multicast packet, belongs, wherein the determining determines whether the multicast address corresponding to a combination of the first physical machine and the virtual network number is stored, and wherein the information about the second physical machine is added to the destination information, corresponding to a multicast address, if the determining determines that the multicast address corresponding to the combination of the first physical machine and the virtual network number is stored.

3. A virtual machine system comprising: a management server comprising: a monitor part that determines whether a migration process in which a virtual machine operating on a first physical machine is migrated to a second physical machine is to be executed, and
a notification part that notifies the relay apparatus of information about the first physical machine and information about the second physical machine if the monitor part determines that the migration process is to be executed; and a relay apparatus comprising: a processor; and a memory, the processor being coupled to the memory and configured to: store destination information about a destination of a multicast packet in association with a multicast address, upon reception of a notification from the notification part, determine whether the destination of the multicast packet is the first physical machine on the basis of the destination information stored and add information about the second physical machine to the destination information, the destination information corresponding to the multicast address that indicates the destination of the first physical machine, if the determination determines that the destination of the multicast packet is the first physical machine, wherein the notification part notifies the relay apparatus of the information about the first physical machine, the information about the second physical machine, and a virtual network number for identifying a virtual network to which the virtual machine belongs if the monitor part determines that the migration process is to be executed, wherein the multicast address and the destination information is stored in association with the virtual network number of the virtual network to which the first physical machine, which is the destination of the multicast packet, belongs, wherein the determination determines whether the multicast address corresponding to a combination of the first physical machine and the virtual network number, received from the notification part is stored, and wherein the information about the second physical machine is added to the destination information corresponding to a multicast address, if the determination determines that the multicast address corresponding to the combination of the first physical machine and the virtual network number is stored.

4. A virtual machine system comprising: a management server comprising:
a first processor configured to execute a first procedure, the first procedure comprising:
determining whether a migration process in which a virtual machine operating on a first physical machine is migrated to a second physical machine is to be executed, and notifying the relay apparatus of information about the first physical machine and information about the second physical machine if the determining determines that the migration process is to be executed; and a relay apparatus comprising:
a memory configured to store destination information about a destination of a multicast packet in association with a multicast address; and a second processor configured to execute a second procedure, the second procedure comprising: upon reception of a notification from the notifying, determining whether the destination of the multicast packet is the first physical machine on the basis of the destination information stored in the memory, and adding information about the second physical machine to the destination information in the memory, the destination information corresponding to the multicast address that indicates the destination of the first physical machine, if the determining determines that the destination of the multicast packet is the first physical machine, wherein the notifying notifies the relay apparatus of the information about the first physical machine, the information about the second physical machine, and a virtual network number for identifying a virtual network to which the virtual machine belongs if the determining determines that the migration process is to be executed, wherein the memory stores the multicast address and the destination information in association with the virtual network number of the virtual network to which the first physical machine, which is the destination of the multicast packet, belongs, wherein the determining determines whether the multicast address corresponding to a combination of the first physical machine and the virtual network number, received from the notifying is stored in the memory, and wherein the adding adds the information about the second physical machine to the destination information in the memory, corresponding to a multicast address, if the determining determines that the multicast address corresponding to the combination of the first physical machine and the virtual network number is stored in the memory.

5. A relay method comprising: determining, in a migration process in which a first physical machine on which a virtual machine operates is migrated to a second physical machine, whether a destination of a multicast packet is the first physical machine on the basis of destination information about the multicast packet stored in a memory in association with a multicast address; and adding information about the second physical machine to the destination information in the memory, corresponding to the multicast address the destination of which is the first physical machine, if the destination of the multicast packet is determined to be the first physical machine in the determining in the migration process in which the first physical machine on which the virtual machine operates is migrated to the second physical machine, whether the destination of the multicast packet is the first physical machine on the basis of destination information about the multicast packet stored in the memory in association with the multicast address, wherein the relay apparatus is notified of the information about the first physical machine, the information about the second physical machine, and a virtual network number for identifying a virtual network to which the virtual machine belongs if the determining determines that the migration process is to be executed, wherein the memory stores the multicast address and the destination information in association with the virtual network number of the virtual network to which the first physical machine, which is the destination of the multicast packet, belongs, wherein the determining determines whether the multicast address corresponding to a combination of the first physical machine and the virtual network number, received from the notifying, is stored in the memory, and wherein the information about the second physical machine is added to the destination information in the memory, corresponding to a multicast address, if the determining determines that the multicast address corresponding to the combination of the first physical machine and the virtual network number is stored in the memory.

* * * * *